(12) United States Patent
Sato et al.

(10) Patent No.: US 8,873,152 B2
(45) Date of Patent: *Oct. 28, 2014

(54) LIQUID OPTICAL ELEMENT ARRAY AND DISPLAY

(75) Inventors: Yoshihisa Sato, Saitama (JP); Yuichi Takai, Tokyo (JP); Miki Tsuchiya, Tokyo (JP)

(73) Assignee: Sony Corporation, Tokyo (JP)

( * ) Notice: Subject to any disclaimer, the term of this patent is extended or adjusted under 35 U.S.C. 154(b) by 433 days.

This patent is subject to a terminal disclaimer.

(21) Appl. No.: 13/208,482

(22) Filed: Aug. 12, 2011

(65) Prior Publication Data

US 2011/0299171 A1 Dec. 8, 2011

(30) Foreign Application Priority Data

Aug. 19, 2010 (JP) ................................. 2010-184363

(51) Int. Cl.
| | |
|---|---|
| *G02B 1/06* | (2006.01) |
| *G02B 3/12* | (2006.01) |
| *G02B 27/10* | (2006.01) |
| *G02B 3/14* | (2006.01) |
| *G02B 26/00* | (2006.01) |

(52) U.S. Cl.
CPC ................ *G02B 3/14* (2013.01); *G02B 26/005* (2013.01)
USPC .......................................... 359/666; 359/618

(58) Field of Classification Search
USPC .................................. 359/618, 619, 665, 666
See application file for complete search history.

(56) References Cited

U.S. PATENT DOCUMENTS

| | | | |
|---|---|---|---|
| 7,853,139 B2 | 12/2010 | Tsuchiya | |
| 7,898,740 B2* | 3/2011 | Heikenfeld et al. | 359/665 |
| 2008/0316302 A1 | 12/2008 | Vos et al. | |
| 2009/0268303 A1* | 10/2009 | Takai | 359/626 |
| 2010/0060974 A1 | 3/2010 | Wang et al. | |

FOREIGN PATENT DOCUMENTS

| | | |
|---|---|---|
| EP | 2 108 983 A2 | 3/2009 |
| JP | 2002-162507 A | 6/2002 |
| JP | 2007-534013 A | 11/2007 |
| JP | 2009-186666 A | 8/2009 |
| JP | 2009-251339 A | 10/2009 |

* cited by examiner

*Primary Examiner* — Alicia M Harrington
(74) *Attorney, Agent, or Firm* — Wolf, Greenfield & Sacks, P.C.

(57) ABSTRACT

A liquid optical element array with good long-term stability is provided. The liquid optical element array includes: a first substrate and a second substrate facing each other; barrier ribs arranged upright on a surface facing the second substrate of the first substrate and sectioning a region on the first substrate into a plurality of cell regions; a first electrode and a second electrode arranged on wall surfaces of the barrier ribs to face each other; a third electrode arranged on a surface facing the first substrate of the second substrate; a projection arranged upright in each of the cell regions on the first substrate or the second substrate; and a polar liquid and a nonpolar liquid sealed between the first substrate and the third electrode and having different refractive indices.

20 Claims, 9 Drawing Sheets

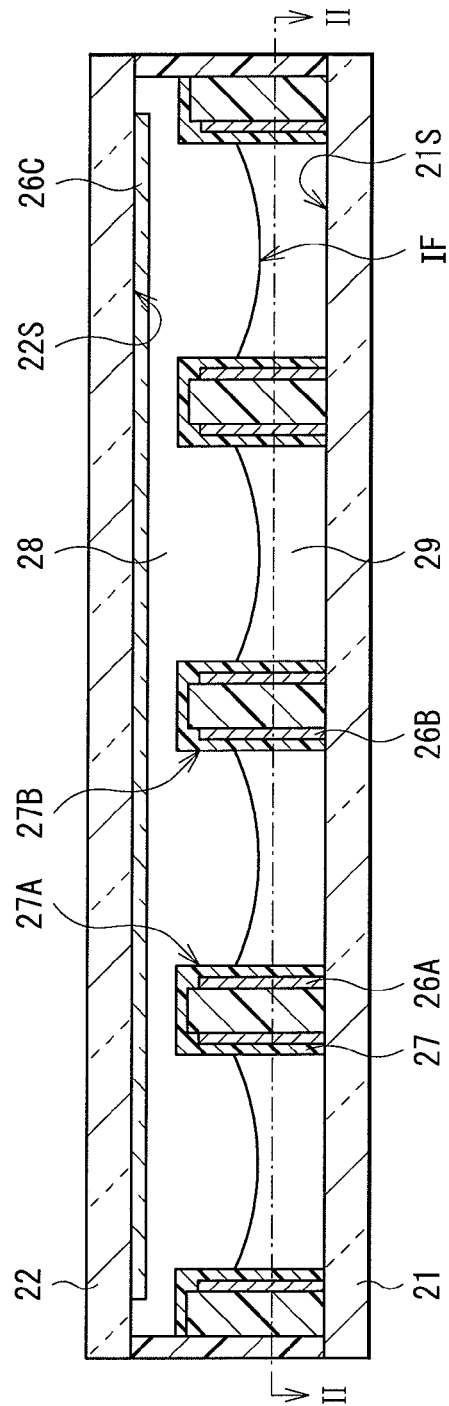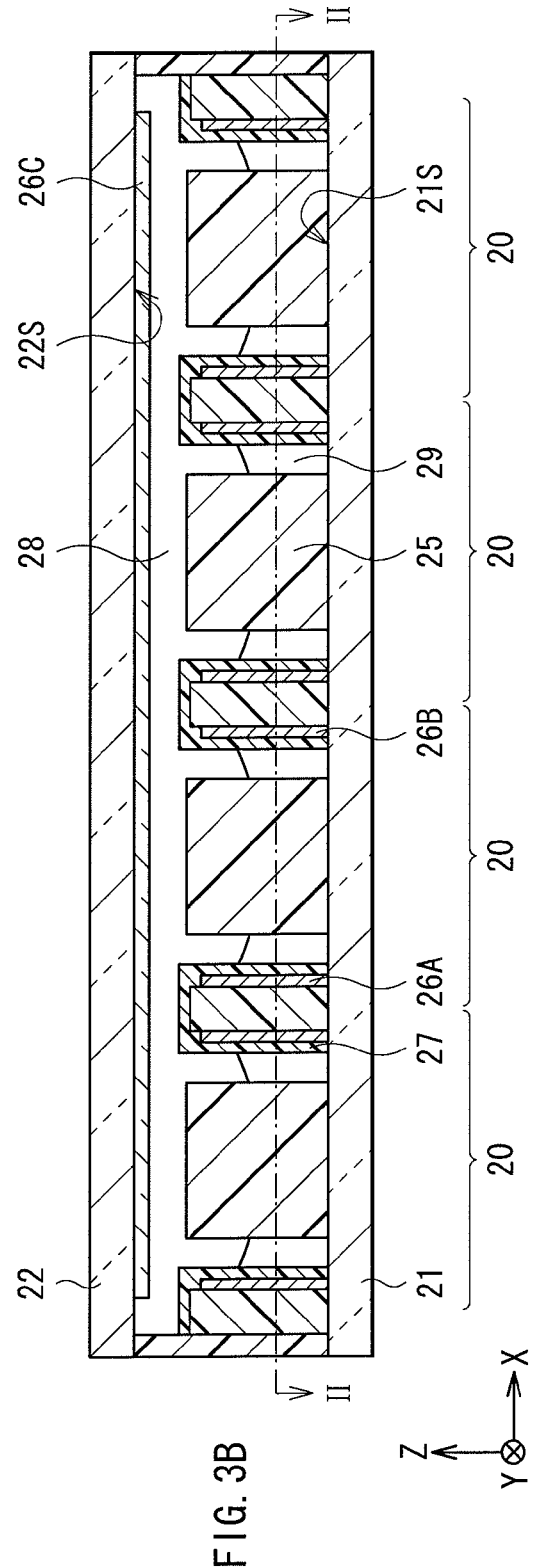
FIG. 3A
FIG. 3B

US 8,873,152 B2

LIQUID OPTICAL ELEMENT ARRAY AND DISPLAY

BACKGROUND

The present technology relates to a liquid optical element array utilizing an electrowetting phenomenon and a display including the liquid optical element array.

Liquid optical elements exerting an optical action by an electrowetting phenomenon (electrocapillarity) have been developed. The electrowetting phenomenon is a phenomenon in which interface energy between a surface of an electrode and an electrically conductive liquid is changed in response to a voltage applied between the electrode and the liquid to cause a change in the surface shape of the liquid.

Examples of liquid optical elements utilizing the electrowetting phenomenon include liquid cylindrical lenses disclosed in Japanese Unexamined Patent Application Publication Nos. 2002-162507 and 2009-251339 and a liquid lenticular lens disclosed in Japanese Unexamined Patent Application Publication (Published Japanese Translation of PCT Application) No. 2007-534013.

SUMMARY

In liquid lenses such as those disclosed in Japanese Unexamined Patent Application Publication Nos. 2002-162507 and 2009-251339 and Japanese Unexamined Patent Application Publication (Published Japanese Translation of PCT Application) No. 2007-534013, an interface shape between two different liquids which are separated from each other and have different refractive indices is changed by controlling a voltage applied to an electrode to obtain a desired focal length. Moreover, when the two different liquids have substantially the same densities, even if the posture of the liquid lens is variously changed, a deviation due to gravity is less likely to occur.

However, there is a difference in density with respect to environmental temperature between liquids with different components. In other words, even if the densities of the two different liquids are the same as each other at an initial environmental temperature (for example, at 20° C.), a change in the environmental temperature may change the densities of the liquids. Therefore, for example, in cylindrical lenses described in Japanese Unexamined Patent Application Publication Nos. 2002-162507 and 2009-251339, two different liquids filled in a predetermined cell region between a pair of facing substrates may greatly move from initial positions. In other words, in the case where the axis direction of the cylindrical lens is used as a vertical direction, depending on the length of the cylindrical lens, a liquid with a relatively small density moves to an upper side of the cell region, and a liquid with a relatively large density moves to a lower side of the cell region. Therefore, in spite of the fact that an interface between the two different liquids is supposed to be parallel to surfaces of a pair of facing substrates in a state where a voltage is not applied, as illustrated in FIG. 10, an interface 130 is inclined relative to the surfaces of the pair of facing substrates. It is to be noted that a liquid optical element array illustrated in FIG. 10 includes a pair of planar substrates 121 and 122 which face each other and a sidewall 123 which is arranged upright along outer edges of the planar substrates 121 and 122 to support the planar substrate 121 and 122. A polar liquid 128 and a nonpolar liquid 129 are sealed in a space enclosed with the planar substrates 121 and 122 and the sidewall 123 to form the above-described interface 130. In such a case, even if a voltage applied to an electrode is changed, the electrowetting phenomenon does not occur, or it is difficult to correctly control the interface shape. Therefore, it is desirable to stably maintain an interface between two different liquids with different refractive indices for a long time.

It is desirable to provide a liquid optical element array capable of maintaining the occurrence of a stable electrowetting phenomenon for a long time and stably providing a favorable optical action and a display including the liquid optical element array.

According to an embodiment of the technology, there is provided a liquid optical element array including:

(A1) a first substrate and a second substrate facing each other;

(A2) barrier ribs arranged upright on a surface facing the second substrate of the first substrate and sectioning a region on the first substrate into a plurality of cell regions;

(A3) a first electrode and a second electrode arranged on wall surfaces of the barrier ribs to face each other;

(A4) a third electrode arranged on a surface facing the first substrate of the second substrate;

(A5) a projection arranged upright in each of the cell regions on the first substrate or the second substrate; and (A6) a polar liquid and a nonpolar liquid sealed between the first substrate and the third electrode and having different refractive indices.

According to an embodiment of the technology, there is provided a display including: a display section and the liquid optical element array according to the above-described embodiment of the technology. The display section is, for example, a display including a plurality of pixels and generating a two-dimensional display image based on a picture signal.

In the liquid optical element array and the display according to the embodiment of the technology, the projection is arranged upright in each of the cell regions sectioned by the barrier rib on the first substrate or the second substrate. Therefore, even if the cell regions extend in a vertical direction, two different liquids with different refractive indices and different densities are stably retained by peripheral members such as the projection and the barrier rib by capillarity.

In the liquid optical element array according to the embodiment of the technology, an interface between the included two different liquids is stably maintained for a long time without the influence of gravity by the posture of the liquid optical element array, and a desired optical action is allowed to be exerted stably. Therefore, in the display including the liquid optical element array according to the embodiment of the technology, a proper image based on a predetermined picture signal is allowed to be displayed for a long time.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 3A and 3B are other sectional views illustrating the configuration of the main part of the wavefront conversion/deflection section illustrated in FIG. 1.

DETAILED DESCRIPTION OF THE PREFERRED EMBODIMENTS

A preferred embodiment of the technology will be described in detail below referring to the accompanying drawings.

[Configuration of Stereoscopic Picture Display]

Figure 1:
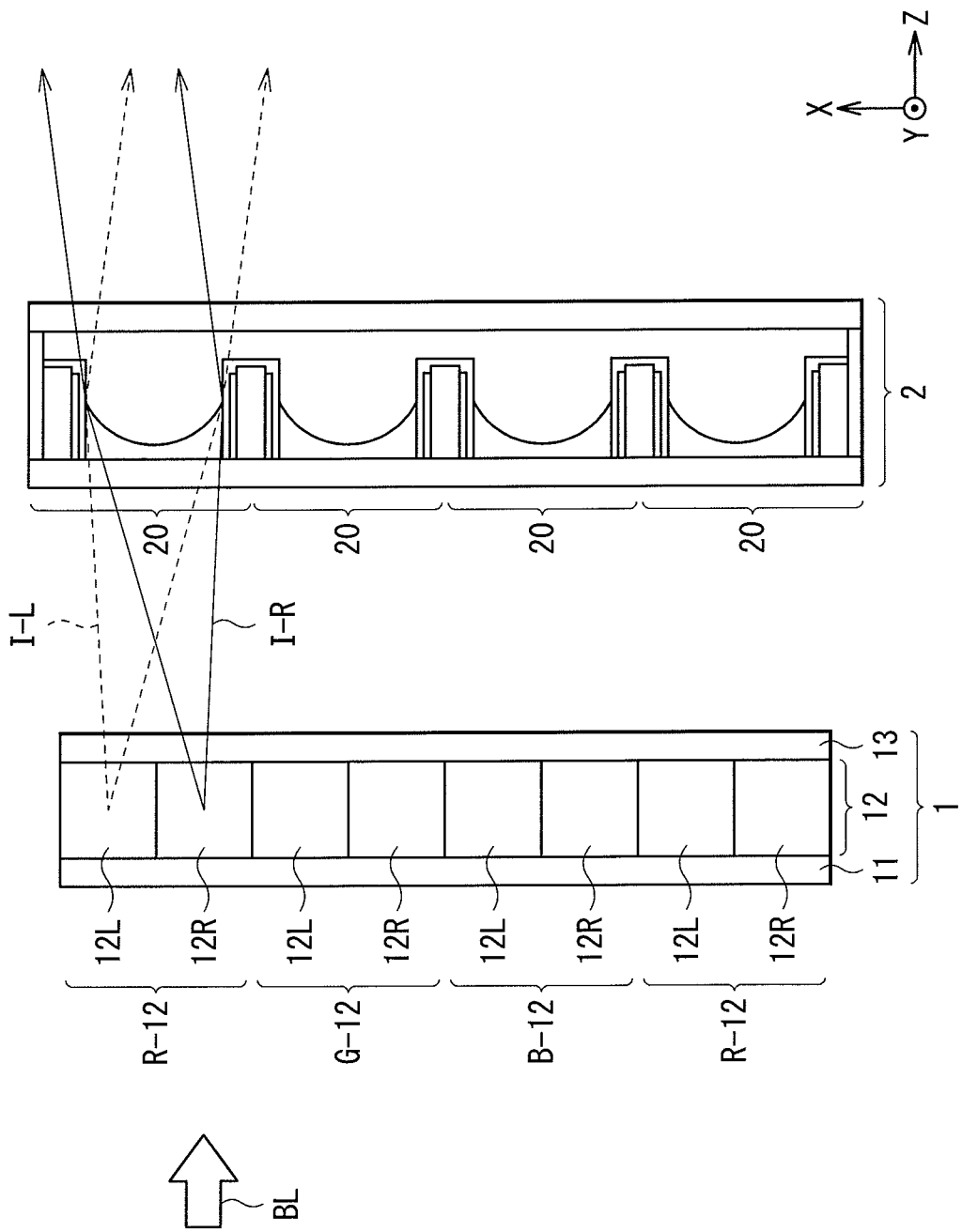
FIG. 1 is a schematic view illustrating a configuration of a stereoscopic picture display according to an embodiment of the technology.

First, referring to FIG. 1, a stereoscopic picture display using a liquid optical element array according to an embodiment of the technology will be described below. FIG. 1 is a schematic view illustrating a configuration example of a stereoscopic picture display according to the embodiment in a horizontal plane.

As illustrated in FIG. 1, the stereoscopic picture display includes a display section including a plurality of pixels 12 and a wavefront conversion/deflection section 2 as a liquid optical element array in order from a side close to a light source (not illustrated). In this case, a light traveling direction from the light source is referred to as a Z-axis direction, and a horizontal direction and a vertical direction are referred to as an X-axis direction and a Y-axis direction, respectively.

The display section 1 generates a two-dimensional display image based on a picture signal, and is, for example, a color liquid crystal display emitting display image light by irradiation with backlight BL. The display section 1 has a configuration in which a glass substrate 11, a plurality of pixels 12 (12L and 12R) each including a pixel electrode and a liquid crystal layer, and a glass substrate 13 are laminated in order from the side close to the light source. The glass substrates 11 and 13 are transparent, and, for example, a color filter including a red (R)-coloring layer, a green (G)-coloring layer and a blue (B)-coloring layer is provided for one of the glass substrates 11 and 13. Therefore, the pixels 12 are classified into pixels R-12 displaying red, pixels G-12 displaying green and pixels B-12 displaying blue. In the display section 1, while the pixel R-12, the pixel G-12 and the pixel B-12 are alternately arranged in the X-axis direction, pixels 12 of the same color are arranged in the Y-axis direction. Moreover, the pixels 12 are classified into pixels emitting display image light forming a left-eye image and pixels emitting display image light forming a right-eye image, and these pixels are alternately arranged in the X-axis direction. In FIG. 1, the pixels 12 emitting display image light for left eye is referred to as pixels 12L and the pixels 12 emitting display image light for right eye is referred to as pixels 12R.

The wavefront conversion/deflection section 2 is configured by arranging, in the X-axis direction in a array, a plurality of liquid optical elements 20 each provided corresponding to, for example, a pair of the pixels 12L and 12R adjacent to each other in the X-axis direction. The wavefront conversion/deflection section 2 performs a wavefront conversion process and a deflection process on display image light emitted from the display section 1. More specifically, in the wavefront conversion/deflection section 2, each liquid optical element 20 corresponding to each pixel functions as a cylindrical lens. In other words, the wavefront conversion/deflection section 2 functions as a lenticular lens as a whole. Therefore, wavefronts of display image light from the pixels 12L and 12R are collectively converted into wavefronts with a predetermined curvature in a group of pixels 12 arranged in the vertical direction (the Y-axis direction) as one unit. In the wavefront conversion/deflection section 2, if necessary, display image light is allowed to be collectively deflected in a horizontal plane (an XZ plane).

Figure 2:
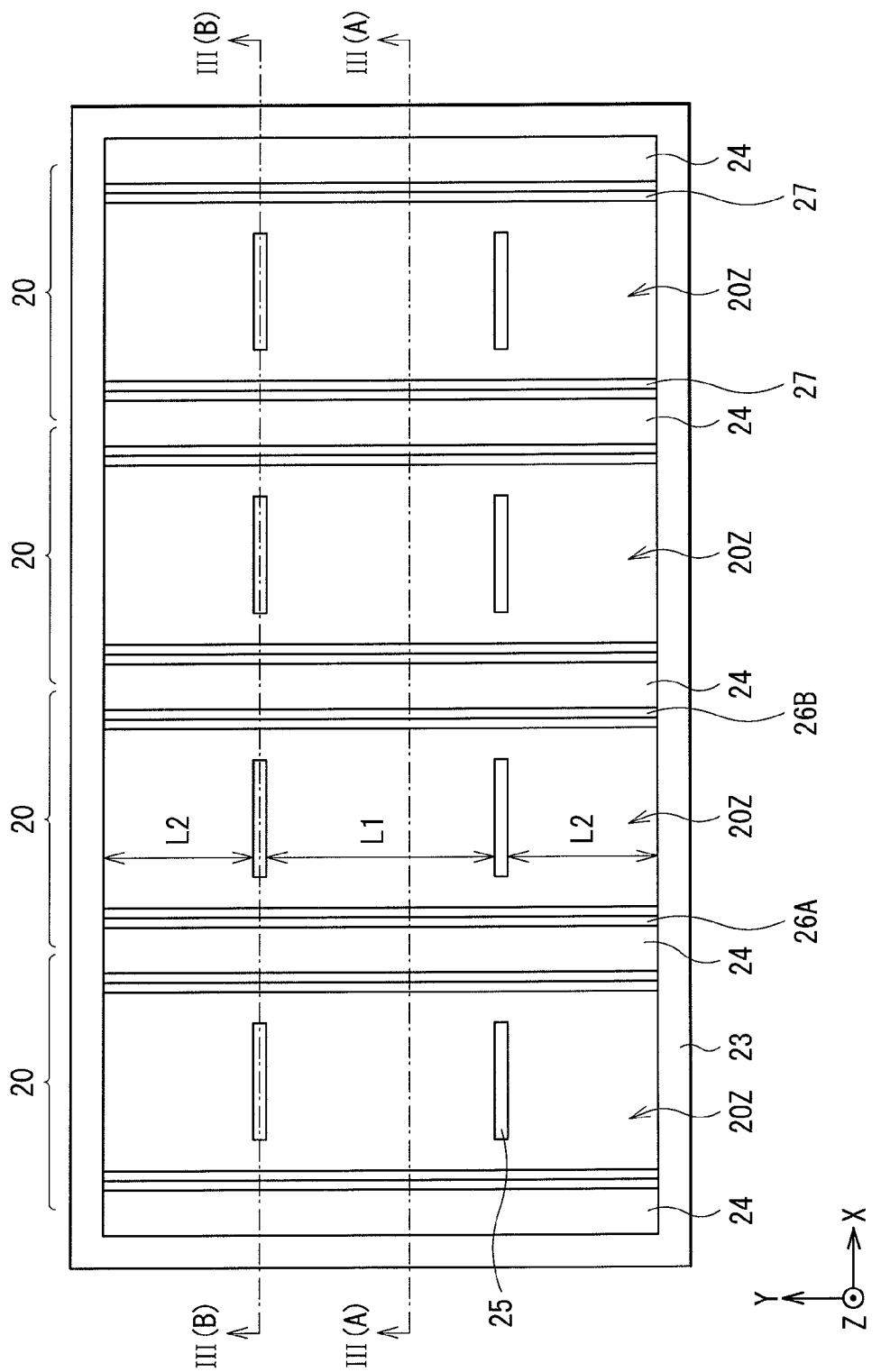
FIG. 2 is a sectional view illustrating a configuration of a main part of a wavefront conversion/deflection section illustrated in FIG. 1.

Referring to FIGS. 2, 3A and 3B, a specific configuration of the wavefront conversion/deflection section 2 will be described below.

FIG. 2 is an enlarged sectional view of a main part of the wavefront conversion/deflection section 2 parallel to an XY plane orthogonal to a traveling direction of display image light. Moreover, FIGS. 3A and 3B are sectional views taken along lines III(A)-III(A) and III(B)-III(B) in arrow directions in FIG. 2. It is to be noted that FIG. 2 corresponds to a sectional view taken along a line II-II in an arrow direction in FIGS. 3A and 3B.

As illustrated in FIGS. 2, 3A and 3B, the wavefront conversion/deflection section 2 includes a pair of planar substrates 21 and 22 facing each other and a sidewall 23 arranged upright along outer edges of the planar substrates 21 and 22 and supporting the planar substrates 21 and 22. A plurality of liquid optical elements 20 extending in the Y-axis direction are arranged in the X-axis direction in a space region enclosed with the planar substrates 21 and 22 and the sidewall 23. The planar substrates 21 and 22 are made of a transparent insulating material allowing visible light to pass therethrough such as glass or transparent plastic.

A plurality of barrier ribs 24 partitioning a space region on the planar substrate 21 into a plurality of cell regions 20Z are arranged upright on a surface 21S facing the planar substrate 22 of the planar substrate 21. In this case, the plurality of the barrier ribs 24 extend in the Y-axis direction, and the barrier ribs 24 form, with the sidewall 23, the cell regions 20Z with a rectangular planar shape corresponding to groups of the pixels 12 arranged in the Y-axis direction, respectively. A nonpolar liquid 29 (which will be described later) is retained in the cell regions 20Z sectioned by the barrier ribs 24. In other words, the barrier ribs 24 prevent the nonpolar liquid 29 from moving (flowing) to other adjacent cell regions 20Z. The barrier ribs 24 are desirably made of a material which is resistant to dissolution or the like into a polar liquid 28 and the nonpolar liquid 29 such as an epoxy-based resin or an acrylic resin.

A first electrode 26A and a second electrode 26B which face each other and are made of a conductive material such as copper (Cu) or ITO are arranged on side walls of each of the barrier ribs 24, respectively. The first and second electrodes 26A and 26B are connected to an external power supply (not illustrated) through a signal line and a control section (both not illustrated) buried in the planar substrate 21. The first and second electrodes 26A and 26B each are allowed to be set to a potential with a predetermined magnitude by the above-described control section. The first and second electrodes 26A and 26B are preferably covered with a hydrophobic insulating film 27 tightly. The hydrophobic insulating film 27 is made of a material having hydrophobicity (water repellency) with respect to the polar liquid 28 (which will be described later) (more strictly, having affinity for the nonpolar liquid 29 (which will be described alter) under a zero-field) and having good electrical insulation. More specifically, the hydrophobic insulating film 27 is made of polyvinylidene fluoride (PVdF) or polytetrafluoroethylene (PTFE) which is fluorine-based polymer. To further enhance electrical insulation between the first electrode 26A and the second electrode 26B, another insulating film made of, for example, spin-on glass (SOG) may be arranged between the first and second electrodes 26A and 26B and the hydrophobic insulating film 27. It is to be noted that an upper end of each of the barrier ribs 24 or the hydrophobic insulating film 27 arranged thereon is preferably separated from the planar substrate 22 and a third electrode 26C.

One or two or more projections 25 are arranged upright in each of the cell regions 20Z on the planar substrate 21. In the case where a plurality of projections 25 are arranged, the projections 25 are preferably arranged at regular intervals along the Y-axis direction. The projections 25 are made of, for example, the same material as that of the barrier ribs 24, and are arranged separately from the barrier ribs 24 and the first and second electrodes 26A and 26B. Moreover, the projections 25 are preferably separated from the planar substrate 22 and the third electrode 26C. Although the case where a plurality of projections 25 are arranged along the Y-axis direction is exemplified in FIG. 2, the number of projections 25 is allowed to be selected arbitrarily.

The third electrode 26C is arranged on a surface 22S facing the planar substrate 21 of the planar substrate 22. The third electrode 26C is made of a transparent conductive material such as indium tin oxide (ITO) or zinc oxide (ZnO), and functions as a ground electrode.

The polar liquid 28 and the nonpolar liquid 29 are sealed in a space region completely enclosed with the pair of planar substrates 21 and 22 and the sidewall 23. The polar liquid 28 and the nonpolar liquid 29 are not dissolved in each other and are separated from each other in a closed space, and form an interface IF therebetween.

The nonpolar liquid 29 is a liquid material having little polarity and having electrical insulation, and, for example, a hydrocarbon-based material such as decane, dodecane, hexadecane or undecane and a silicon oil are suitable. The nonpolar liquid 29 preferably has a sufficient capacity to cover the whole surface of the planar substrate 21 therewith in the case where a voltage is not applied between the first electrode 26A and the second electrode 26B.

On the other hand, the polar liquid 28 is a liquid material having polarity, and, for example, in addition to water, a solution in which an electrolyte such as potassium chloride or sodium chloride is dissolved is suitable. When a voltage is applied to the polar liquid 28, wettability of the polar liquid 28 with respect to inner surfaces 27A and 27B (a contact angle between the polar liquid 28 and the inner surfaces 27A and 27B) is greatly changed, compared to that of the nonpolar liquid 29. The polar liquid 28 is in contact with the third electrode 26C as the ground electrode.

The polar liquid 28 and the nonpolar liquid 29 are adjusted to have substantially the same densities at room temperature (for example, 20° C.), and a positional relationship between the polar liquid 28 and the nonpolar liquid 29 is determined by a sealing order. As the polar liquid 28 and the nonpolar liquid 29 are transparent, light passing through the interface IF is refracted according to an incident angle thereof and the refractive indices of the polar liquid 28 and the nonpolar liquid 29.

Moreover, the polar liquid 28 and the nonpolar liquid 29 are stably retained in initial positions (positions illustrated in FIGS. 3A and 3B) by the projections 25, because as the polar liquid 28 and the nonpolar liquid 29 are in contact with the projections 25, interface tension in a contact interface therebetween acts. In particular, the length of an interval L1 (refer to FIG. 2) between the projections 25 arranged in the same cell region 20Z is preferably equal to or smaller than a capillary length $K^{-1}$ represented by the following conditional expression (1). The capillary length $K^{-1}$ herein is a maximum length where the influence of gravity on interface tension generated between the polar liquid 28 and the nonpolar liquid 29 is negligible. Therefore, in the case where the interval L1 satisfies the conditional expression (1), the polar liquid 28 and the nonpolar liquid 29 are retained in the initial positions (positions illustrated in FIGS. 3A and 3B) extremely stably without influence of the posture of the wavefront conversion/deflection section 2.

$$K^{-1} = \{\Delta\gamma/\Delta\rho \times g)\}^{0.5} \quad (1)$$

where $K^{-1}$ is a capillary length (mm), $\Delta\gamma$ is interface tension (mN/m) between the polar liquid and the nonpolar liquid, $\Delta\rho$ is a density difference (g/cm$^3$) between the polar liquid and the nonpolar liquid, and g is gravity acceleration (m/s$^2$).

Moreover, in the embodiment, because of the same reason as that described above, a minimum length L2 from the sidewall 23 in the Y-axis direction to the projection 25 located at each end in the Y-axis direction in the plurality of projections 25 is preferably equal to or smaller than the capillary length $K^{-1}$ represented by the above-described conditional expression (1).

As described above, the capillary length $K^{-1}$ depends on the kinds of two media forming the interface therebetween. For example, in the case where the polar liquid 28 is water and the nonpolar liquid 29 is an oil, the interface tension $\Delta\gamma$ and the density difference $\Delta\rho$ in the conditional expression (1) are 29.5 mN/m and 0.129 g/cm$^3$, respectively; therefore, the capillary length $K^{-1}$ is 15.2 mm. Therefore, when the density difference $\Delta\rho$ is equal to or smaller than 0.129 g/cm$^3$, the interval L2 and the length L2 is allowed to be 15.2 mm at maximum.

In each of the liquid optical elements 20, in a state where a voltage is not applied between the first and second electrodes 26A and 26B (a state where the potentials of the first and second electrodes 26A and 26B are zero), as illustrated in FIG. 3A, the interface IF has a convex-curved surface from the polar liquid 28 to the nonpolar liquid 29. The curvature of the interface IF at this time is constant in the Y-axis direction, and each of the liquid optical elements 20 functions as one cylindrical lens. Moreover, the curvature of the interface IF in this state (a state where a voltage is not applied between the first and second electrodes 26A and 26B) is at maximum. A contact angle $\theta_1$ of the nonpolar liquid 29 with respect to the inner surface 27A and a contact angle $\theta_2$ of the nonpolar liquid 29 with respect to the inner surface 27B are allowed to be adjusted, for example, by selecting the material of the hydrophobic insulating film 27. When the nonpolar liquid 29 has a larger refractive index than the polar liquid 28 in this case, the liquid optical element 20 exerts negative refractive power. On the other hand, when the nonpolar liquid 29 has a smaller refractive index than the polar liquid 28, the liquid optical element 20 exerts positive refractive power. For example, in the case where the nonpolar liquid 29 is a hydrocarbon-based material or a silicon oil and the polar liquid 28 is water or an electrolytic solution, the liquid optical element 20 exerts negative refractive power.

Figure 4A:
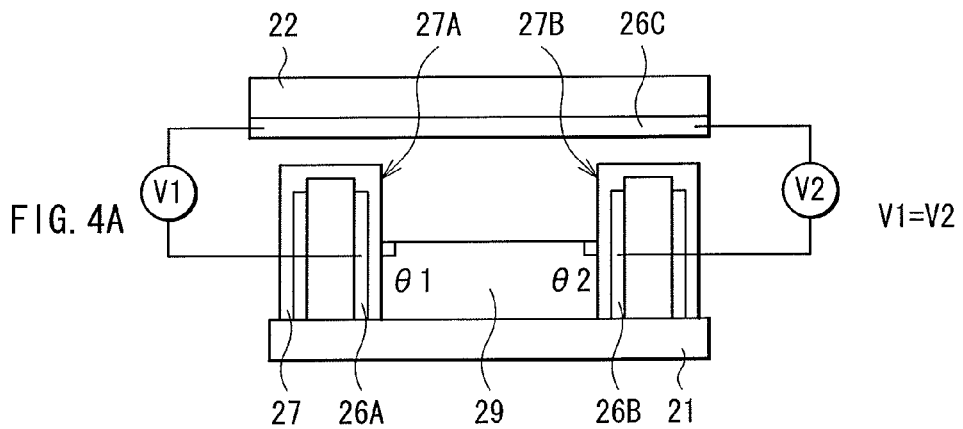
FIGS. 4A, 4B and 4C are conceptual views for describing an operation of a liquid optical element illustrated in FIGS. 3A and 3B.
Figure 4B:
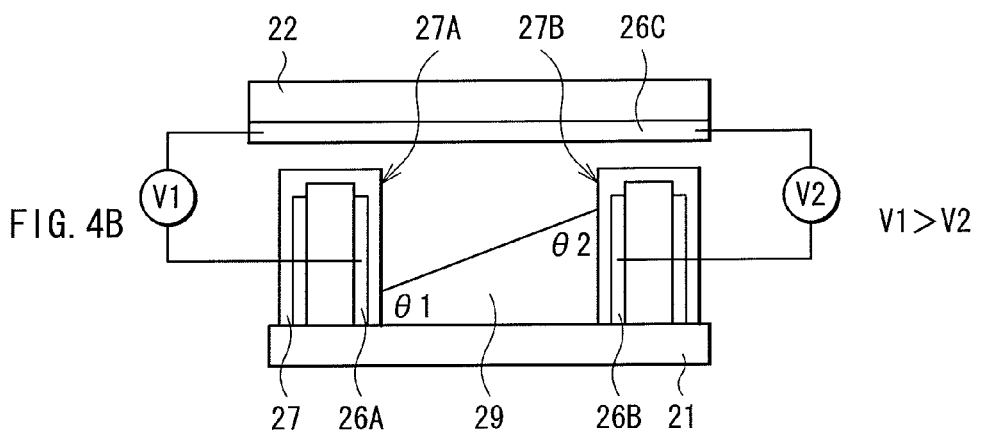
Figure 4C:
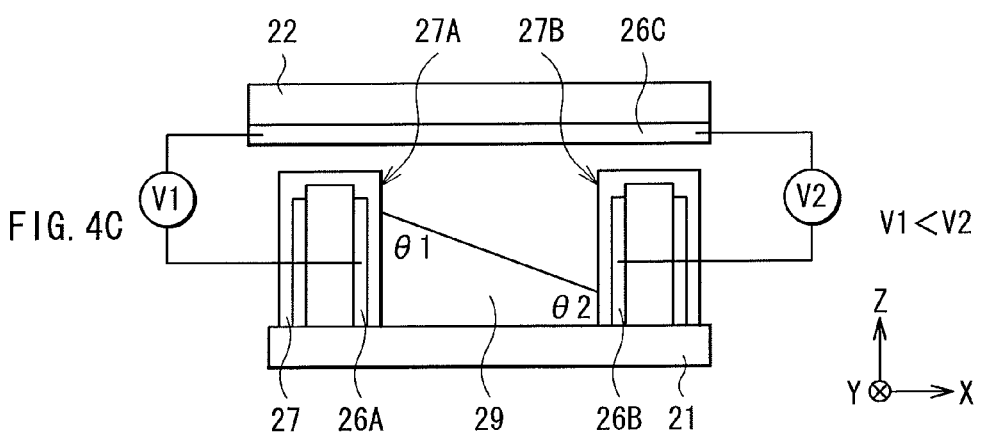

When a voltage is applied between the first and second electrodes 26A and 26B, the curvature of the interface IF is reduced, and when a certain or higher voltage is applied, for example, the interface IF forms a plane as illustrated in FIGS. 4A, 4B and 4C. It is to be noted that FIG. 4A illustrates the case where the potential (V1) of the first electrode 26A and the potential (V2) of the second electrode 26B are equal to each other (V1=V2). In this case, each of the contact angles θ1 and θ2 is a right angle) (90°). At this time, incident light entering the liquid optical element 20 and passing through the interface IF is not subjected to an optical action such as convergence, divergence or deflection in the interface IF and is emitted as it is from the liquid optical element 20.

In the case where the potential V1 and the potential V2 are different from each other (V1≠V2), for example, as illustrated in FIGS. 4B and 4C, the interface IF forms a plane inclined with respect to an X axis and a Z axis (a plane parallel to a Y axis) (θ1≠θ2). More specifically, in the case where the potential V1 is larger than the potential V2 (V1>V2), as illustrated in FIG. 4B, the contact angle θ1 is larger than the contact angle θ2 (θ1>θ2). On the other hand, in the case where the potential V1 is smaller than the potential V2 (V1<V2), as illustrated in FIG. 4C, the contact angle θ1 is smaller than the contact angle θ2 (θ1<θ2). In these cases (V1≠V2), for example, incident light entering the liquid optical element 20 in parallel to the first and second electrodes 26A and 26B is refracted and deflected in an XZ plane in the interface IF. Therefore, when the magnitudes of the potentials V1 and V2 are adjusted, incident light is allowed to be deflected to a predetermined direction in the XZ plane.

It is considered that the above-described phenomenon (a change in the contact angles θ1 and θ2 by the application of a voltage) occurs in the following manner. A charge is accumulated in the inner surfaces 27A and 27B by the application of a voltage, and the polar liquid 28 having polarity is pulled to the hydrophobic insulating film 27 by the Coulomb force of the charge. Accordingly, while areas in contact with the inner surfaces 27A and 27B of the polar liquid 28 are increased, the nonpolar liquid 29 moves (is deformed) to be removed from parts in contact with the inner surfaces 27A and 27B by the polar liquid 28; therefore, the interface IF becomes close to a plane accordingly.

Figure 5A:
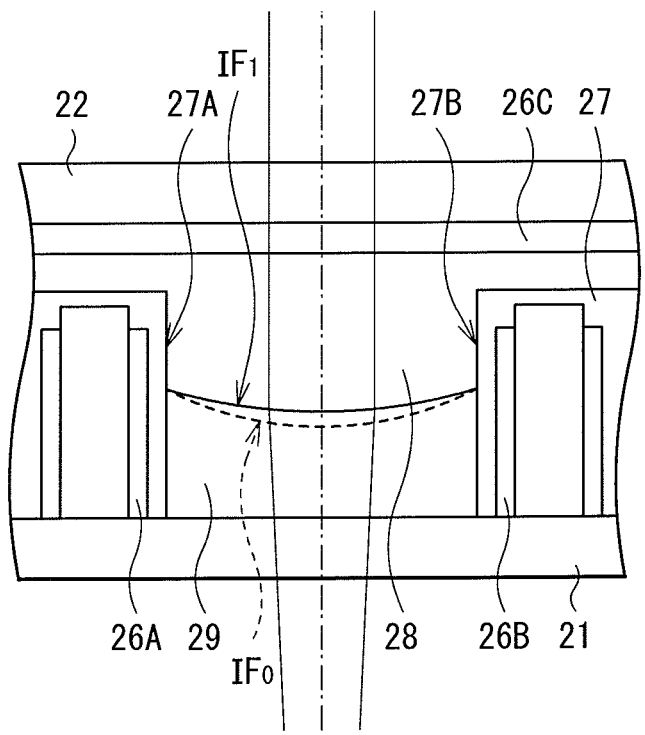
FIGS. 5A and 5B are other conceptual views for describing the operation of the liquid optical element illustrated in FIGS. 3A and 3B.
Figure 5B:
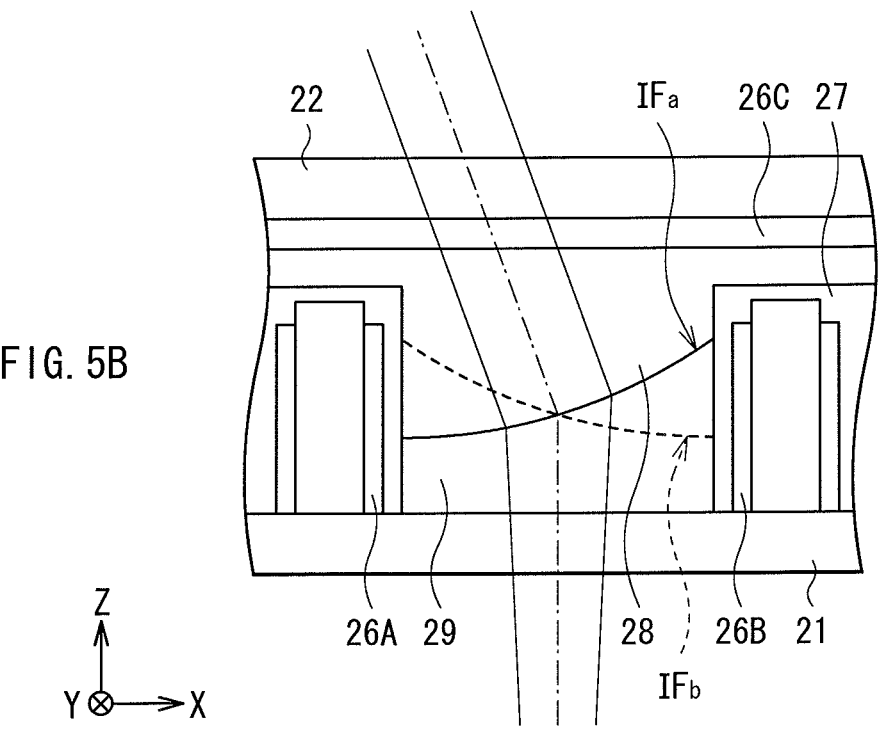

Moreover, the curvature of the interface IF is changed by adjustment of the magnitudes of the potentials V1 and V2. For example, in the case where the potentials V1 and V2 (in the case of V1=V2) have a value smaller than a potential Vmax in the case where the interface IF forms a horizontal plane, for example, as illustrated in FIG. 5A, an interface $IF_1$ (indicated by a solid line) with a smaller curvature than that of an interface $IF_0$ (indicated by a broken line) in the case where the potentials V1 and V2 are zero is obtained. Therefore, refractive power exerted on light passing through the interface IF is allowed to be adjusted by changing the magnitudes of the potentials V1 and V2. In other words, the liquid optical element 20 functions as a variable-focus lens. Moreover, when the potentials V1 and V2 have different magnitudes (V1≠V2) in this state, the interface IF is inclined while having an appropriate curvature. For example, in the case where the potential V1 is larger (V1>V2), an interface IFa indicated by a solid line in FIG. 5B is formed. On the other hand, in the case where the potential V2 is larger (V1<V2), an interface IFb indicated by a broken line in FIG. 5B is formed. Therefore, when the magnitudes of the potentials V1 and V2 are adjusted, the liquid optical element 20 is allowed to deflect incident light in a predetermined direction while exerting appropriate refractive power on the incident light. FIGS. 5A and 5B illustrate a change in incident light when the interfaces $IF_1$ and IFa are formed in the case where the nonpolar liquid 29 has a larger refractive index than the polar liquid 28 and the liquid optical element 20 exerts negative refractive power.

[Operation of Stereoscopic Picture Display]

In the stereoscopic picture display, when a picture signal is supplied to the display section 1, left-eye display image light IL is emitted from the pixel 12L and right-eye display image light IR is emitted from the pixel 12R. The display image light IL and the display image light IR enter the liquid optical element 20. In the liquid optical element 20, an appropriate value of voltage is applied to the first and the second electrodes 26A and 26B to allow a focal length of the liquid optical element 20 to be equal to a distance air-equivalent to a refractive index between the pixels 12L and 12R and the interface IF. It is to be noted that depending on the position of a viewer, the focal length of the liquid optical element 20 may be changed slightly. The emission angles of the display image light IL and the display image light IR emitted from the pixels 12L and 12R of the display section 1 are selected by a function of a cylindrical lens formed by the interface IF between the polar liquid 28 and the nonpolar liquid 29 in the liquid optical element 20. Therefore, as illustrated in FIG. 1, the display image light IL and the display image light IR enter the left eye and the right eye of the viewer, respectively. Thus, the viewer is allowed to observe a stereoscopic picture.

Moreover, in the liquid optical element 20, when the interface IF forms a flat plane (refer to FIG. 4A), and wavefront conversion is not performed on the display image light IL and the display image light IR, a two-dimensional image with high resolution is allowed to be displayed.

Thus, in the wavefront conversion/deflection section 2 according to the embodiment, the projections 25 are arranged upright on the planar substrate 21 in the cell regions 20Z sectioned by the barrier ribs 24. Therefore, even in the case where the wavefront conversion/deflection section 2 (the liquid optical elements 20) is arranged to allow the cell regions 20Z to extend in the vertical direction, two different liquids (the polar liquid 28 and the nonpolar liquid 29) with different refractive indices and different densities are stably retained by peripheral members such as the projections 25 and the barrier ribs 24 by capillarity. In other words, each of the liquid optical elements 20 is allowed to stably maintain the interface IF for a long time without the influence of gravity by the posture thereof, and to stably exert a desired optical action. Therefore, in a stereoscopic display including the liquid optical elements 20, a proper image corresponding to a predetermined picture signal is allowed to be displayed for a long time.

Moreover, in the embodiment, the projections 25 arranged upright on the planar substrate 21 are arranged separately from the barrier ribs 24 covered with the hydrophobic insulating film 27, the planar substrate 22 and the third electrode 26C. Therefore, variations in position of the interface IF in the same cell region 20Z are preventable, and a stable optical action is allowed to be provided for the display image light IL (or IR) from a plurality of pixels 12L (or 12R) arranged along the Y-axis direction. Moreover, in the case where the projections 25 are arranged to be connected to the barrier ribs 24 adjacent thereto, a plurality of closed regions are formed by the projections 25 and the barrier ribs 24. In this case, as it is necessary to individually fill the polar liquid 28 and the nonpolar liquid 29 in each of the plurality of closed regions in a manufacturing state, it is disadvantageous in efficiency, and variations in filled amounts of the liquids is concerned. On the other hand, in the embodiment, the projections 25 are separated from the barrier ribs 24; therefore, such an issue is solved.

[Modification 1]

Figure 6:
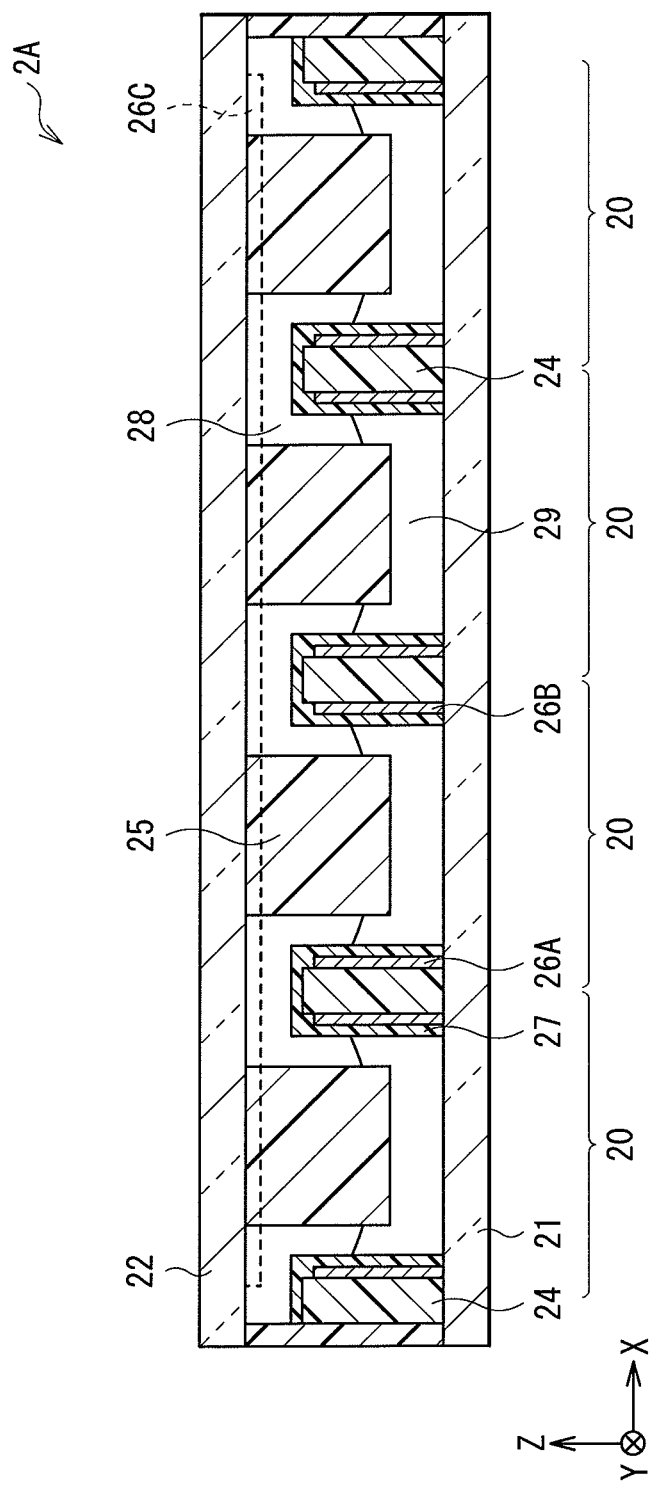
FIG. 6 is a schematic sectional view illustrating a configuration of a wavefront conversion/deflection section as Modification 1.

FIG. 6 illustrates a wavefront conversion/deflection section 2A as a first modification (Modification 1) of the embodiment. FIG. 6 illustrates a sectional configuration of the wavefront conversion/deflection section 2A, and corresponds to FIG. 3B in the above-described embodiment. In the above-described embodiment, the projections 25 are arranged upright on the planar substrate 21 with the barrier ribs 24; however, in the modification, the projections 25 are arranged upright on the planar substrate 22. In doing so, when the wavefront conversion/deflection section 2A is assembled, the barrier ribs 24 arranged upright on the planar substrate 21 and the projections 25 arranged upright on the planar substrate 22 are fit into each other to make alignment between the planar substrate 21 and the planar substrate 22 easier. Also in the modification, the projections 25 are preferably arranged separately from the planar substrate 22, the barrier ribs 24 and the first to third electrodes 26A to 26C.

[Modification 2]

Figure 7:
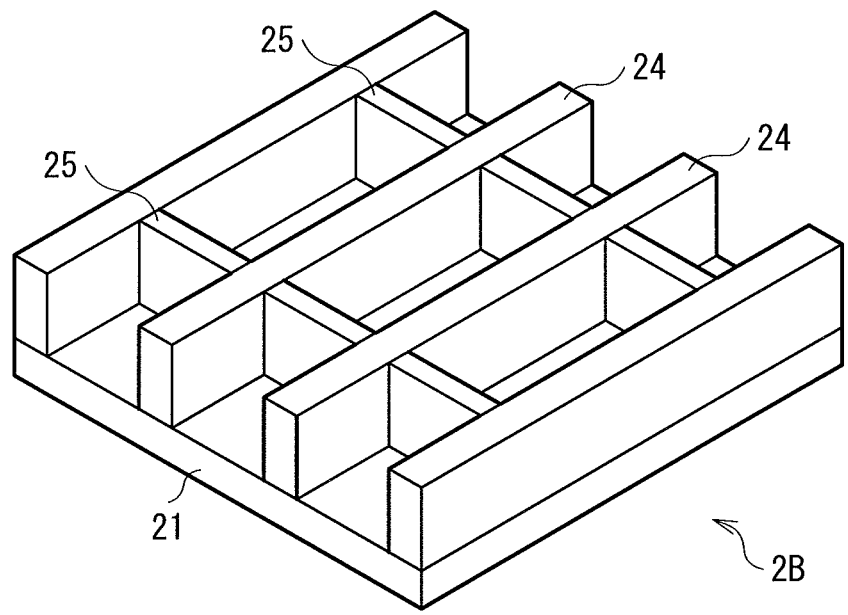
FIG. 7 is a schematic perspective view illustrating a configuration of a wavefront conversion/deflection section as Modification 2.

FIG. 7 illustrates a wavefront conversion/deflection section 2B as a second modification (Modification 2) of the embodiment. FIG. 7 is a perspective view illustrating a schematic configuration of the wavefront conversion/deflection section 2B. In the above-described embodiment, side ends of the projections 25 are separated from the barrier ribs 24; however, in the modification, the side ends of the projections 25 are connected to side surfaces of the barrier ribs 24. In doing so, an improvement in structural stability is expected.

[Modification 3]

Figure 8:
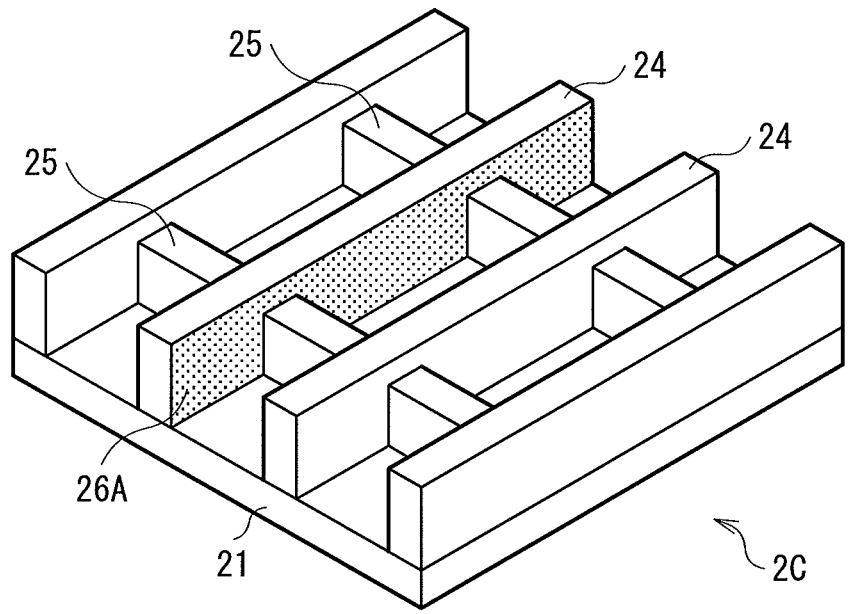
FIG. 8 is a schematic perspective view illustrating a configuration of a wavefront conversion/deflection section as Modification 3.

FIG. 8 illustrates a wavefront conversion/deflection section 2C as a third modification (Modification 3) of the embodiment. In Modification 2, the upper end positions of the projections 25 are substantially as high as the upper end positions of the barrier ribs 24; however, in the modification, the upper end positions of the projections 25 are lower than the upper end positions of the barrier ribs 24. In doing so, compared to Modification 2, an increase in resistance in parts astride the projections 25 of the first and second electrodes 26A and 26B formed on the side surfaces of the barrier ribs 24 is allowed to be reduced.

Although the present technology is described referring to the embodiment, the technology is not limited thereto, and may be variously modified. For example, in the above-described embodiment, the liquid optical elements 20 in the wavefront conversion/deflection section 2 exert a convergence or divergence action and a deflection action. However, a wavefront conversion section and a deflection section may be separately arranged to provide the convergence or divergence action and the deflection action for display image light, respectively.

Figure 9:
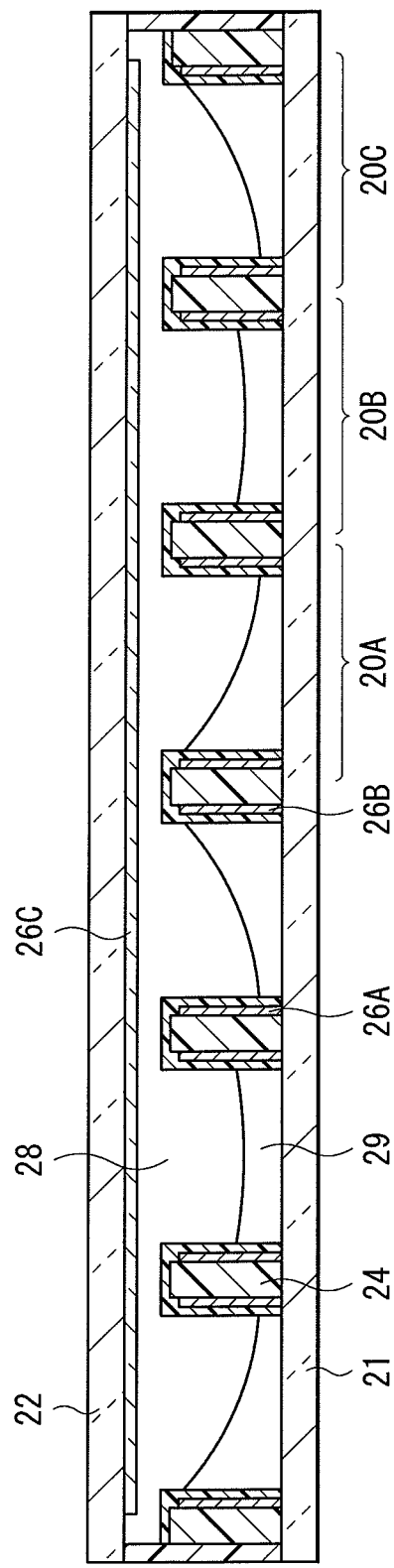
FIG. 9 is a sectional view for describing another example of use of the wavefront conversion/deflection section illustrated in FIG. 1.
Figure 10:
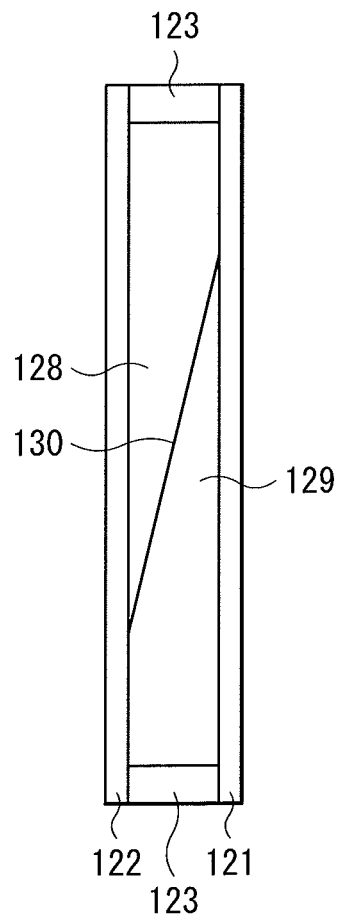
FIG. 10 is a sectional view illustrating a configuration example of a liquid optical element in related art.

Moreover, as illustrated in FIG. 9, one pair of pixels 12L and 12R may correspond to a plurality of liquid optical elements 20, and a combination of the plurality of liquid optical elements 20 may function as one cylindrical lens. FIG. 9 illustrates an example in which liquid optical elements 20A, 20B and 20C configure one cylindrical lens.

Further, in the above-described embodiment, the third electrode 26C extends on the surface 22S of the planar substrate 22 to correspond to all of the plurality of cell regions 20Z. However, as long as a state where the third electrode 26C is slightly in contact with the polar liquid 28 is maintained consistently, the size (formation area) of the third electrode 26C is allowed to be selected arbitrarily.

Moreover, in the above-described embodiment, the color liquid crystal display using a backlight as a two-dimensional image generation section (a display section) is exemplified; however, the technology is not limited thereto. For example, the technology is applicable to, for example, a display using an organic EL element or a plasma display.

The present application contains subject matter related to that disclosed in Japanese Priority Patent Application 2010-184363 filed in the Japan Patent Office on Aug. 19, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid optical element array comprising:
a first substrate and a second substrate facing each other;
barrier ribs arranged upright on a surface facing the second substrate of the first substrate and sectioning a region on the first substrate into a plurality of cell regions;
a first electrode and a second electrode arranged on wall surfaces of the barrier ribs to face each other;
a third electrode arranged on a surface facing the first substrate of the second substrate;
a projection arranged upright in each of the cell regions on the first substrate or the second substrate; and
a polar liquid and a nonpolar liquid sealed between the first substrate and the third electrode and having different refractive indices, wherein the polar liquid and the nonpolar liquid are in contact with the projection.

2. The liquid optical element array according to claim 1, wherein
the projection in each of the cells regions is arranged upright on the first substrate and is arranged separately from the second substrate and the third electrode.

3. The liquid optical element array according to claim 1, wherein
the barrier ribs are arranged separately from the second substrate and the third electrode.

4. The liquid optical element array according to claim 1, wherein
the projection is arranged separately from the barrier ribs and the first and second electrodes.

5. The liquid optical element array according to claim 1, wherein
the plurality of cell regions are arranged along a first direction and each have a rectangular shape having a long side in a second direction orthogonal to the first direction, and
a plurality of the projections are arranged along the second direction.

6. The liquid optical element array according to claim 1, wherein
the first and second electrodes are covered with a hydrophobic insulating film having water repellency with respect to the polar liquid.

7. The liquid optical element array according to claim 1, wherein
a plurality of the projections are provided for each of the cell regions, and the length of an interval between the projections arranged in one cell region is equal to or smaller than a capillary length represented by the following conditional expression (1):

$$K^{-1} = \{\Delta\gamma/\Delta\rho \times g)\}^{0.5} \tag{1}$$

where $K^{-1}$ is a capillary length (mm), $\Delta\gamma$ is interface tension (mN/m) between the polar liquid and the nonpolar liquid, $\Delta\rho$ is a density difference (g/cm³) between the polar liquid and the nonpolar liquid, and g is gravity acceleration (m/s²).

8. The liquid optical element array according to claim 1, wherein:
the projection in each of the cells regions is arranged upright on the second substrate and is arranged separately from the first substrate.

9. The liquid optical element array according to claim 1, further comprising:
a plurality of projections arranged upright in each of the cell regions on the first substrate or the second substrate.

10. The liquid optical element array according to claim 1, wherein:
the projection comprises a first material; and
the barrier ribs comprise the first material.

11. The liquid optical element array according to claim 1, wherein the first material is a resin.

12. A liquid optical element array comprising:
a first substrate and a second substrate facing each other;
a polar liquid and a nonpolar liquid arranged between the first substrate and the second substrate and having different refractive indices;
a barrier rib sectioning a region on the first substrate into a plurality of cell regions; and
a projection arranged upright in each of the cell regions on the first substrate or the second substrate, wherein the projection is arranged separately from the barrier rib and wherein the polar liquid and the nonpolar liquid are in contact with the projection.

13. The liquid optical element array according to claim 12, wherein
the projection arranged upright on the first substrate is arranged separately from the second substrate.

14. The liquid optical element array according to claim 12, wherein
the projection arranged upright on the second substrate is arranged separately from the first substrate.

15. The liquid optical element array according to claim 12, further comprising:
a plurality of projections arranged upright in each of the cell regions on the first substrate or the second substrate.

16. The liquid optical element array according to claim 12, wherein:
the projection comprises a first material; and
the barrier ribs comprise the first material.

17. A display including a display section and a liquid optical element array, the liquid optical element array comprising:
a first substrate and a second substrate facing each other;
barrier ribs arranged upright on a surface facing the second substrate of the first substrate and sectioning a region on the first substrate into a plurality of cell regions;
a first electrode and a second electrode arranged on wall surfaces of the barrier ribs to face each other;
a third electrode arranged on a surface facing the first substrate of the second substrate;
a projection arranged upright in each of the cell regions on the first substrate or the second substrate; and
a polar liquid and a nonpolar liquid sealed between the first substrate and the third electrode and having different refractive indices, wherein the polar liquid and the nonpolar liquid are in contact with the projection.

18. The display according to claim 17, wherein
the liquid optical element array has a function of deflecting display image light from the display section to a horizontal direction.

19. The display according to claim 18, wherein
the liquid optical element array also functions as a wavefront conversion section converting the curvature of a wavefront in display image light from the display section.

20. The display according to claim 17, further comprising:
a plurality of projections arranged upright in each of the cell regions on the first substrate or the second substrate.

* * * * *